United States Patent
Ausloos et al.

(10) Patent No.: US 7,840,320 B2
(45) Date of Patent: Nov. 23, 2010

(54) METHOD FOR MONITORING PLANE ENGINES

(75) Inventors: Alexandre Ausloos, Favieres (FR); Jonathan Benitah, Vincennes (FR); Olivier Armand Joseph Maka, Peterborough (CA); Jean-Remi Masse, Saint Cloud (FR)

(73) Assignee: Hispano Suiza, Colombes (FR)

( * ) Notice: Subject to any disclaimer, the term of this patent is extended or adjusted under 35 U.S.C. 154(b) by 0 days.

(21) Appl. No.: 12/021,643

(22) Filed: Jan. 29, 2008

(65) Prior Publication Data

US 2008/0262663 A1 Oct. 23, 2008

(30) Foreign Application Priority Data

Jan. 30, 2007 (FR) ................... 07 00642

(51) Int. Cl.
*G01M 17/00* (2006.01)
(52) U.S. Cl. ..................... 701/29
(58) Field of Classification Search ............ 701/1, 701/3, 21, 29, 31, 32, 34, 102; 73/35.03, 73/35.06, 118.02–118.04
See application file for complete search history.

(56) References Cited

U.S. PATENT DOCUMENTS 4,106,730 A * 8/1978 Spitzer et al. ............... 244/183
5,349,654 A * 9/1994 Bond et al. .................. 714/45

* cited by examiner

*Primary Examiner*—Kim T Nguyen
(74) *Attorney, Agent, or Firm*—Oblon, Spivak, McClelland, Maier & Neustadt, L.L.P.

(57) ABSTRACT

A method for monitoring engines of a plane, including at least two engines, each engine being controlled and monitored by an engine monitoring calculator, the calculators being connected to each other by a communication network and each calculator monitoring operating parameters of one engine. The method being characterized in that both calculators output on the network the value of at least one of the parameters for comparison with the same parameter outputted by the other calculator, and if a value of one calculator deviates from a value of the other calculator by a difference higher than a predetermined threshold, one of the engines is diagnosed as operating abnormally.

5 Claims, 1 Drawing Sheet

METHOD FOR MONITORING PLANE ENGINES

BACKGROUND OF THE INVENTION

1. Field of the Invention

The present invention relates to systems for detecting operating deficiencies of plane engines, and more generally, of all equipment systems at least doubled in the plane, and belonging to the main parts thereof, such as propeller group, steerings, etc.

It more particularly relates to systems for monitoring main parts so as to warn the operating (steering or maintenance) staff of a defective operation.

2. Discussion of the Background

As a system for detecting an abnormal operation with a view to assisting the maintenance, an integrated test equipment (so-called "Built-In Test Equipment": BITE) is generally used, being specific to the bad operation under consideration.

Being warned, the plane pilot can avoid making use of such equipment, call on an alternative equipment, and thereby, avoid a more serious incident, or, being assisted by the diagnosis as provided by the BITE, the maintenance staff could act more easily and faster upon a plane maintenance operation for repairing the defect.

SUMMARY OF THE INVENTION

Nowadays, most BITEs essentially comprise sensors that collect operating data or parameters and such parameters are digitized and tested with by software referring to predetermined thresholds or mathematical models.

Here, each engine is controlled by a calculator referred to by the acronym "FADEC" (Full Authority Digital Engine Control).

FADECs monitor each the operating parameters of the engine they control. Such engine parameters are compared with predetermined thresholds being identical for identical engine configurations, whatever plane they are mounted on.

Now, planes have each a specific use, thus making their wear individualized. Engines are therefore subject to a specific and non modelizable wear in a predetermined way.

The above predetermined thresholds are therefore not able to provide for a monitoring of the engine parameters specific to their wear.

However, it is possible to monitor a wear typical parameter of engines and to track the damage thereof. By determining criticity thresholds, several steps of such damage could be identified. But such a technique would require, amongst others, to determine the most significant parameters of the deficiency modes, the wear thresholds to be applied to such parameters and the influence exerted by the use conditions on their behaviour. All this requires too great of knowledge of physical phenomena related to them.

The Applicant have tried to find a solution for simplifying the above described problem and consequently they propose their invention.

Thus, the present invention relates to a method for monitoring plane engines comprising at least two engines, each engine being controlled and monitored by a engine monitoring calculator, the calculators being connected between them by a communication network and each calculator monitoring operating parameters of the engine it monitors, the method being characterized in that both calculators emit on the network the value of at least one of said parameters for being compared with that of the same parameter as emitted by the other calculator, and in that, if a value should deviate from the other by a difference higher than a predetermined threshold, one of the engines is diagnosed as being in an abnormal operation.

The environment and the use being identical for both engines, only the performance thereof influences the differences being recorded. It is no longer necessary to master the laws of physics for detecting the defects thereof.

For a given plane, an engine shows an abnormal behaviour as soon as the wear as shown by a given parameter differs from the wear as shown by the same parameter on the other plane engine, whence the comparisons to be performed.

For example, phenomena related to temperature, engine speed, behaviour and altitude, disturb the level of lubrication oil in its tank, making it impossible to know the amount of oil available at a given time. Through the above mentioned comparisons, it can be at least known at any time if both engines have available the same amount of oil or if one of the two tanks is leaking.

The invention consists in applying a redundancy technique currently used in the field of personal and plane safety to the above mentioned field of the BITE built-in test used for assisting maintenance.

Such a redundancy technique consists in putting in parallel with identical critical equipment materials, a number n, so as to be able to determine by a simple comparison of their outputs, that should at any time be substantially identical, if one of them is defective, or even the one that is being defective and should be removed. Detecting requires two parallel equipment materials, while isolating defective equipment requires at least three of them.

Here, there are many parameters, as for the oil leaks in the above described example, for which isolating the defective engine could be achieved even for a twin-engine plane.

In summary, the engine redundancy technique is therefore used both for diagnosis, forecast and maintenance purposes, together with strong probability data.

Preferably, the calculators monitoring the engines will be those that actually carry out the comparisons and establish the resulting diagnosis, but the latter could be equally carried out by a self-standing central calculator connected with the network.

Still preferably, each diagnosis of an "engine" calculator is emitted by the latter towards the other for being immediately compared and either being stored for maintenance or resulting in an immediate action such as, for example, being displayed to the pilot or emitted by a radio at a ground station.

BRIEF DESCRIPTION OF THE DRAWINGS

Other features and advantages of the present invention will become more apparent by reading the herein-under description of the method for monitoring plane engines according to this invention, made by referring to the appended drawing, on which.

DESCRIPTION OF THE PREFERRED EMBODIMENTS

Figure 1:
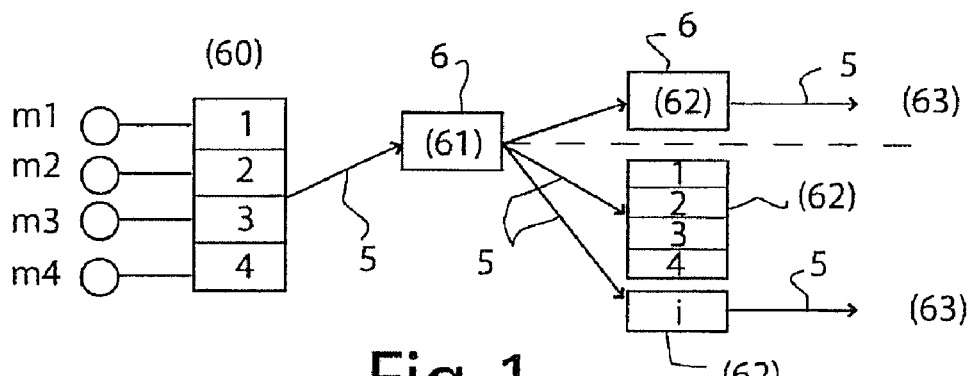
FIG. 1 is a first architecture form of an engine monitoring system implementing the method of the invention.
Figure 2:
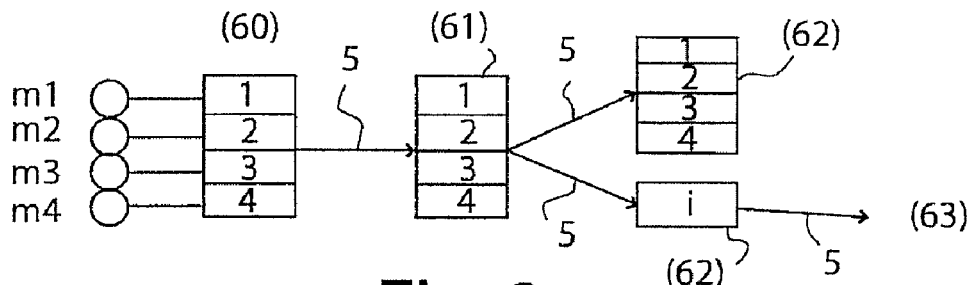
FIG. 2 is a second architecture form of an engine monitoring system implementing the method of the invention.

Referring to FIGS. 1 and 2, the architecture will be detailed in the example of a four-engine plane. The monitoring and controlling system 10 for engines m1, m2, m3, m4 of a plane (not shown), comprises FADEC calculators 1, 2, 3, 4, each monitoring and controlling a respectively designated engine m(1), m(2), m(3), m(4), or m1, m2, m3, m4 in the figures.

The FADECs, here four of them, are connected between them via the plane by an AFDX (Avionics Full DupleX) digital communication network 5, for example, defined by the ARINC (Aeronautical Radio INCorporated) standard, either through a specific link as provided for the hereinafter presented communications, or through a pre-existing link of the plane dedicated to other communications, and emit data and parameters from the engine they are supposed to monitor and control. The FADECs being two-way calculators, those ways make it possible to strengthen the information as received from one or the other FADECs.

In a first embodiment (FIG. 1), there is provided a "plane" central calculator 6 also connected with this network 5 for pooling by one of its functions 61 and processing by one of its functions 62, data and parameters it receives from all the FADECs 1, 2, 3, 4, as will be explained hereinafter.

In a second preferred embodiment, (FIG. 2), it is one of the FADECs 1, 2, 3, or 4, i.e. the FADEC i, that plays itself the role of the function 62 of the calculator 6, which is not useful for implementing the invention.

However, in this latter case, all the FADECs 1, 2, 3, 4 are identical and could simultaneously process, similarly to the function 61 and as will be explained hereinafter, data and parameters of the engine they are responsible for, added with data and parameters (emitted by the other FADECs) received on the network 5.

In the first case, it is to be noticed that the central calculator 6 can only play the role of an intermediary 61 on the network 5 for only pooling data and parameters emitted by the FADECs and for optionally determining the FADEC i that is to perform the hereinafter processing.

Figure 3:
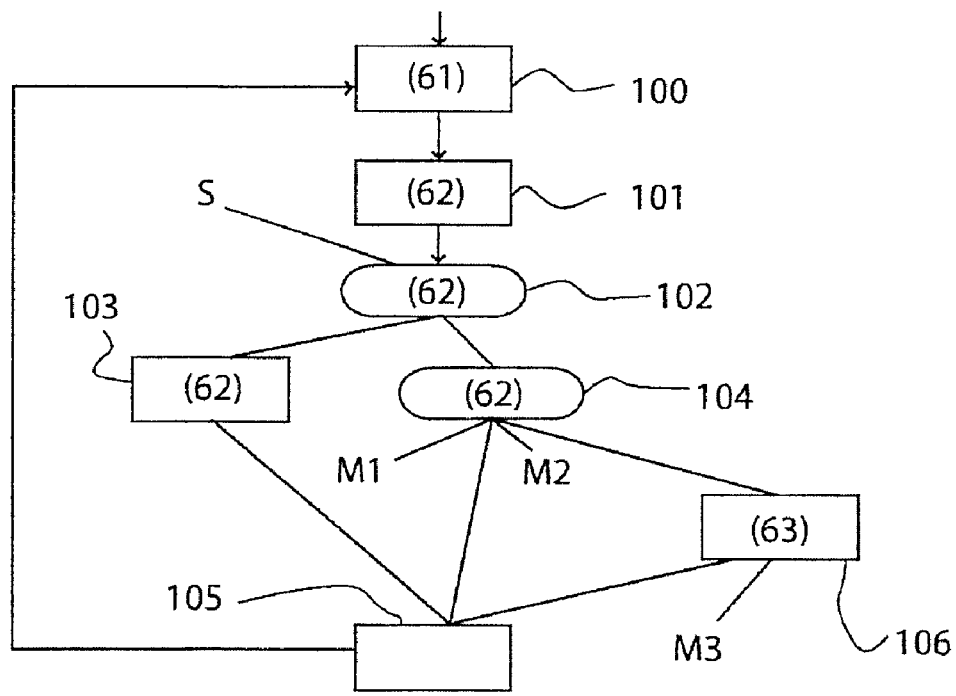
FIG. 3 is a simplified flow chart of the plane engine monitoring method according to the invention.

Thus, any FADEC 1, 2, 3, 4, or the central calculator 6, or the FADEC i, according to the adopted architecture, has available the same data and parameters from all the engines m1, m2, m3, m4 of the plane and performs the monitoring processing 62 which will be now explained, referring to FIG. 3, simultaneously with the monitoring method.

In step 100, by an emission function 60 on the network 5, the FADEC calculators 1, 2, 3, 4 emit on the network 5 the value V(1), V(2), V(3) and V(4), respectively, of at least one operating parameter for the engines m1, m2, m3, m4 respectively, together with its engine marker "m1", "m2", "m3", "m4" corresponding to its emission address, and with its parameter reference p(1), p(2), p(3), p(4), respectively.

The FADEC j (j=1 to 4), or the calculator 6, receives, either through the reception and pooling function 61 for the parameters emitted on the network 5, or through the function 61 of the other FADECs, the triplets V(k), m(k), p(k) (k=1 to 4, k different from j) and has available four triplets corresponding to k=1, 2, 3, 4.

In step 101, by means of the function 62 of the calculator 6 or any FADEC 1 to 4, any value V(k) is compared to the three other values V(k') for k'=1, 2, 3, 4, k' being different from k, but only if p(k')=p(k), that shows that this is the same parameter, but corresponding to two different engines m(k) and m(k').

Absolute values $d1(k)$, $d2(k)$, $d3(k)$ of the differences V(k)–V(k') between the values of such parameters could, for example, be calculated.

In step 102, the above mentioned differences d1, d2, d3 are compared with a predetermined threshold S, corresponding to a measurement tolerance of the parameter.

If, in step 103, no difference exceeds the threshold S, the procedure proceeds with step 105 without any particular action.

Otherwise, the procedure proceeds with step 104 wherein the number of differences exceeding the threshold S is counted. Then, for example, if only one difference d1 does exceed the threshold S, the event is stored in a memory M1 and the procedure proceed with step 105.

If two differences d1, d2 exceed the threshold S, the absolute value d of the difference V(2)–V(1) is calculated. If d is lower then 2.S, the procedure proceeds with step 105, otherwise the event is stored in a memory M2 and the procedure proceeds with step 105.

If the three differences d1, d2, d3 are higher than S, the parameter p(k) deviates from all the other parameters p(k') by a difference higher than the threshold S, then the engine k has an operation or a wear abnormally deviating from that of the other engines k'. All the other operating functions remaining further identical, the procedure proceeds with step 106 wherein the engine is recorded as being in an abnormal operation relative to that of the other engines, by means of a display function 63 and the event is stored in a memory M3, and the procedure proceeds with step 105.

In step 105, the inscription in memories M1, M2, M3 is dated so as to allow for a history of the events to be re-established so as to better assist the maintenance, and as the method is to be applied continuously in operation, step 101 is again started.

When the FADEC calculators 1, 2, 3, 4 monitoring the engines are those that perform the comparisons and establish the resulting diagnosis by means of the above mentioned method, they are all able to emit their diagnosis in parallel and such diagnoses themselves are subjected to a consolidation vote for determining an overall diagnosis to be displayed.

Thereby, a breakdown occurring on one or two FADECs is overcome, making the system 10 twice as secured, or twice "fail operative", according to the Anglo-Saxon terminology.

The diagnoses of the FADEC calculators could be emitted by each of them towards the others for being compared therein and either be stored in a housing for maintenance, or result in an immediate action such as, for example, being displayed to the pilot or emitted by a radio at a "ground" station, but such diagnoses could also be emitted to a "plane" central calculator for memorization, display, ground broadcast or any other system control that could be required.

Conversely, using a self-standing central calculator 6 connected with the network 5 for centralizing the processing, it is not possible to overcome a breakdown occurring on said calculator.

It should be noted that there is taken advantage of the fact that the engines are in a three-fold or four-fold redundancy for personal safety purposes for exploiting the induced redundancy of the engine parameters so as to provide a significant improvement in the diagnosis accuracy to the built-in tests for assisting the FADEC maintenance.

As has been described, the invention applies to aircrafts comprising more than two engines, but equally applies to parameters of planes comprising two engines, for which the only occurrence of a deviation accounts for a defective engine.

This is, as has been observed, the case for oil (or other liquid) levels. This is also the case for other numerous examples, such as:

the start duration, increasing with the engine wear and that could show a damaged engine, the engine speed, showing the wear of the fuel pump.

A mathematical model could also be added, with an evolution as a function of the use and the environment of the plane in order to remove any doubt between two engines the parameters of which, as they do not have the above described properties of showing the defective engine, will deviate too much relative to the selected threshold.

Together with the parameter comparison, the mathematical model could allow to isolate a defect.

This invention could also apply to other assemblies than the propeller engine, such as generally four-fold flight commands, cockpit closing systems, etc.

The invention claimed is:

1. A method for monitoring at least two engines in a plane, comprising:
   controlling and monitoring the at least two engines by engine monitoring calculators, each engine monitoring calculator of the engine monitoring calculators is assigned to monitor one engine of the at least two engines, and each engine monitoring calculator of the engine monitoring calculators are connected to all other engine monitoring calculators by a communication network;
   monitoring with each engine monitoring calculator, operating parameters of the one of the at least two engines it is assigned to monitor;
   one engine monitoring calculator for one of the at least two engines outputting on the network a first value for at least one of the operating parameters for comparison with a second value of a same operating parameter outputted by an other engine monitoring calculator for an other engine of the at least two engines, and each engine monitoring calculator outputs operating parameters to all other engine operating calculators via the network;
   diagnosing one of the at least two engines as operating abnormally, by determining in the engine monitoring calculators, if the first value deviates from the second value by a difference higher than a predetermined threshold; and
   outputting a diagnosis of an engine monitoring calculator to another engine monitoring calculator for comparison therein.

2. A method according to claim 1, wherein each diagnosis is stored in a memory of each engine monitoring calculator for maintenance.

3. A method according to claim 1, wherein diagnoses are displayed to a pilot of the plane or transmitted by a radio at a ground station.

4. A method according to claim 1, wherein the engine monitoring calculators display the resulting diagnoses.

5. A method according to claim 1, wherein there are four engine monitoring calculators that monitor four engines.

* * * * *